J. H. ADAMSON.
Rotary Winnowers.
No. 145,980.
Patented Dec. 30, 1873.
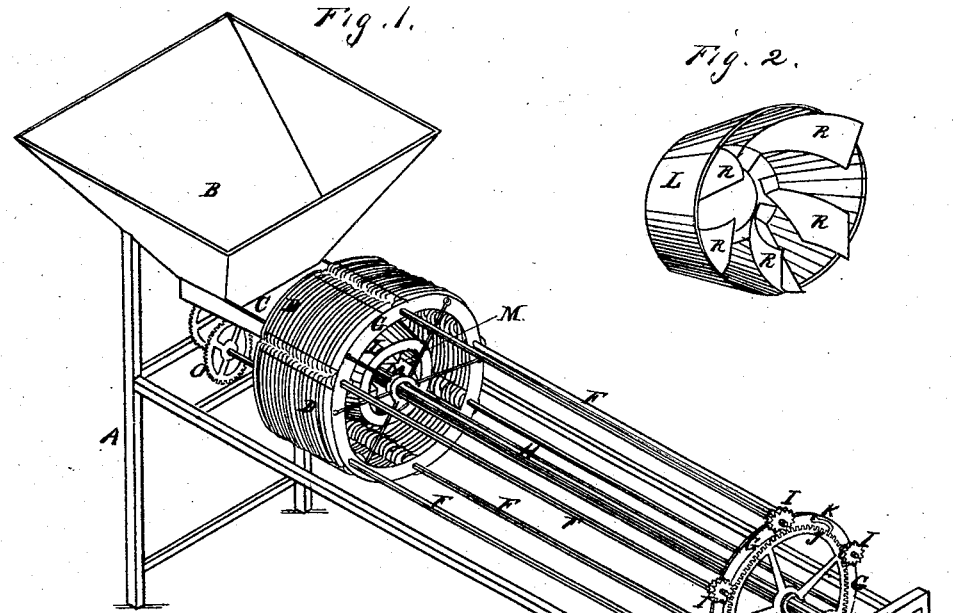
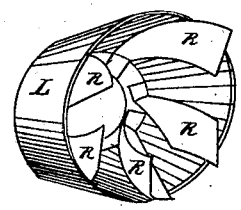
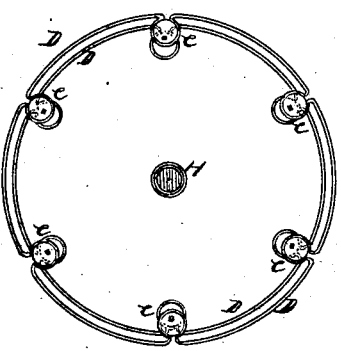
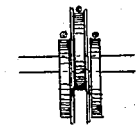
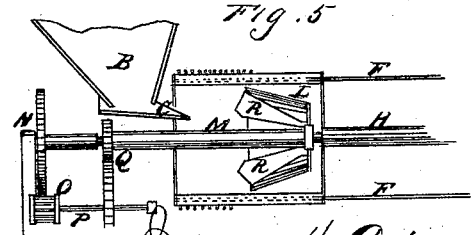
Witnesses
J. L. Borne
C. Milton Richardson
James H. Adamson
Per Dewey & Co
attys
AM. PHOTO-LITHOGRAPHIC CO. N.Y. (OSBORNE'S PROCESS)

UNITED STATES PATENT OFFICE.

JAMES H. ADAMSON, OF SAN FRANCISCO, CALIFORNIA.

IMPROVEMENT IN ROTARY WINNOWERS.

Specification forming part of Letters Patent No. 145,980, dated December 30, 1873; application filed September 23, 1873.

*To all whom it may concern:*

Be it known that I, JAMES H. ADAMSON, of San Francisco city and county, State of California, have invented a Rotary Grain-Separator; and I do hereby declare the following description and accompanying drawings are sufficient to enable any person skilled in the art or science to which it most nearly appertains to make and use my said invention without further invention or experiment.

My invention relates to a novel device for cleaning and separating grain from its chaff and dust, which I call a rotary grain-cleaner; and it consists, mainly, in the employment of a cylindrical or other suitably-shaped screen, which is made of wire, so mounted upon eccentrics placed at intervals around its circumference that, by proper adjusting mechanism, each alternate circle of wire can be expanded and contracted, thus giving a greater or less space between them to suit the size of the grain to be cleaned. My invention also consists in locating, concentric with and inside the screen, a rotary blower having the shape of a truncated cone, and having arranged in it spiral blades, increasing in width as they approach the large end of the blower-casing, thereby giving a divergent blast.

Referring to the accompanying drawings for a more complete explanation of my invention, Figure 1 is a perspective view of my machine. Fig. 2 is a detached view of the blower or fan. Fig. 3 is an enlarged view of one of the screen-circles with its operating eccentrics. Fig. 4 is an edge view of the eccentrics. Fig. 5 is a section of the fan and the gearing.

A is a supporting-frame, carrying the feed-hopper B at one end. This hopper opens, by means of an inclined trough, C, from below into the cleaning-cylinder. This cylinder consists of a series of circles of wire, D, formed, as shown at Fig. 3, so as to be expansible. These circles are placed side by side, so as to to form the cylinder, and they are supported by the expanding and contracting eccentrics e, which are mounted upon the rods or bars F. These bars are supported at intervals around the periphery of the rims or disks G, the disks being supported from a central axis, H.

Now it will be manifest that when the bars F are all turned partly around the eccentrics will be turned also, and one set will carry the wires attached to them outward, while the other set will carry their wires inward, thus leaving a greater or less space between them as different kinds of grain have to be cleaned. The peculiar formation of the wires will allow them to be expanded or contracted to a larger or smaller circle, as desired.

The rods F each carry a pinion, I, upon their outer ends, and these mesh into the larger gear-wheel J upon the central axis H. By turning this gear slightly all the pinions and the bars F will be operated simultaneously. When they are to be held stationary, a pawl, K, upon the rim G drops into the teeth of the gear J, and prevents it from turning. The whole machine is turned about together upon the axis H by a crank or other device. The fan or blower L is mounted upon a sleeve, M, which turns loosely upon the shaft H inside the cylinder. The main shaft H, passing through this sleeve, is supported by a box at N, and a gear-wheel upon this shaft drives the pinion O upon a short shaft, P. A gear-wheel from this shaft turns the pinion Q upon the sleeve M, and thus the blower is driven at a high speed. The form of the blower is that of a truncated cone, with a hole in the smaller end around the sleeve M, and through this the air is drawn by the action of the spiral fans or blades R within the blower. The blades R are made narrow at the small end of the cone-shaped casing, and increase greatly as they approach the open end of the cone. By this construction, I am enabled to give a blast which diverges from the center of the screen toward the hopper B. The air thus drawn in is discharged around the periphery of the larger end of the cone, and thus acts to separate the chaff from the grain, giving what I term a side blast.

The cleaning-chamber may be made octagonal, or with the sides straight between the eccentrics, or of other suitable shape; and I do not wish to be confined to the especial form here described.

Having thus described my invention, what I claim, and desire to secure by Letters Patent, is—

1. The wires D, in combination with the cams e, for the purpose of changing the size of the meshes of the cylinder, as set forth.

2. The eccentrics or cams e, mounted upon the bars F, and the pinions I and gear-wheel J, for the purpose of simultaneously adjusting the rings D to make the proper mesh, substantially as herein described.

3. The cone-shaped casing L, concentrically arranged within the cylinder, in combination with the large end blades R, for the purpose of creating a diverging blast, as set forth.

4. A grain-cleaner consisting of the rotary cylinder, composed of the adjustable rings D, with their eccentrics e, and their operating devices, as shown, in combination with the propeller-blower, mounted within the cylinder, substantially as and for the purpose herein described.

In witness whereof I hereunto set my hand and seal.

JAMES HAZEL ADAMSON. [L. S.]

Witnesses:
JNO. L. BOONE,
C. MILTON RICHARDSON.